United States Patent [19]

Chang

[11] Patent Number: 6,050,849

[45] Date of Patent: Apr. 18, 2000

[54] STAND HAVING A HOUSING ADAPTED FOR SUPPORTING A LIQUID CRYSTAL DISPLAY PANEL ON A BASE, AND A UNIVERSAL SERIAL BUS HUB MODULE MOUNTED DETACHABLY ON THE HOUSING

[75] Inventor: Lin-Yang Chang, Taipei, Taiwan

[73] Assignee: Compal Electronics, Inc., Taipei, Taiwan

[21] Appl. No.: 09/112,988

[22] Filed: Jul. 10, 1998

[51] Int. Cl.⁷ .................................................. H01R 13/60
[52] U.S. Cl. .......................................... 439/536; 439/638
[58] Field of Search .............................. 439/31, 527, 536, 439/535, 638

[56] References Cited

U.S. PATENT DOCUMENTS

| | | | |
|---|---|---|---|
| 5,458,503 | 10/1995 | Below | 439/404 |
| 5,652,893 | 7/1997 | Ben-Meir et al. | 395/750.02 |
| 5,675,813 | 10/1997 | Holmdahl | 395/750.02 |
| 5,961,345 | 10/1999 | Finn et al. | 439/536 |

*Primary Examiner*—Khiem Nguyen
*Attorney, Agent, or Firm*—Pillsbury Madison & Sutro LLP

[57] ABSTRACT

A stand includes a housing with an upper portion to be mounted on a liquid crystal display (LCD) panel, and a lower portion to be secured on a base. A display power connector is mounted on the housing and connects electrically the LCD panel to a power source. A display signal connector is mounted on the housing and connects electrically the LCD panel to a computer. A first hub power connector is mounted on the housing and provides a voltage output. A universal serial bus (USB) hub module includes a hub casing, a USB connector set mounted on the hub casing, a second hub power connector mounted on the hub casing, and a USB hub controller mounted inside the hub casing and connected electrically to the connector set and the second hub power connector. The hub module is mounted detachably on the housing such that the second hub power connector engages removably the first hub power connector for supplying the voltage output from the first hub power connector as operating power to the hub controller.

5 Claims, 5 Drawing Sheets

STAND HAVING A HOUSING ADAPTED FOR SUPPORTING A LIQUID CRYSTAL DISPLAY PANEL ON A BASE, AND A UNIVERSAL SERIAL BUS HUB MODULE MOUNTED DETACHABLY ON THE HOUSING

BACKGROUND OF THE INVENTION

1. Field of the Invention

The invention relates to a stand for supporting a liquid crystal display (LCD) panel on a base, more particularly to a stand of the aforementioned type that includes a housing and a universal serial bus (USB) hub module mounted detachably on the housing.

2. Description of the Related Art

A conventional LCD device includes an LCD panel, a base, and an upright stand for supporting the LCD panel on the base. The stand generally has a housing and a display connector, such as a 15-pin D-sub connector, mounted on the housing and adapted to permit electrical connection between the LCD panel and a computer. In order to increase the functionality of the LCD device, the LCD device may be provided with a USB hub capability by mounting a number of standard USB connectors on the housing and by incorporating a USB hub controller, which is connected electrically to the USB connectors, inside the housing. As such, the computer can be connected to a number of input/output (I/O) peripheral devices, such as printers, scanners, modems, etc., via the USB connectors on the stand of the LCD device.

However, providing the stand with an integral USB hub capability increases the cost of the LCD device. Since the USB hub capability is an optional feature, some consumers might not be willing to spend more for the inclusion of this feature. Thus, manufacturers of LCD devices must continue to make two different types of stands, e.g. one having a built-in USB hub capability and the other having no USB hub capability, for the LCD devices.

SUMMARY OF THE INVENTION

Therefore, the object of the present invention is to provide a stand that includes a housing adapted for supporting an LCD panel on a base, and a USB hub module mounted detachably on the housing. Since the USB hub module is separate from the housing, consumers can purchase the USB hub module as an optional component, thereby obviating the need for manufacturers of LCD devices to supply two different kinds of stands, e.g. one having no USB hub capability and the other having a built-in USB hub capability, to meet the demands of different consumers.

Accordingly, the stand of the present invention is adapted for supporting an LCD panel on a base, and comprises:

- a housing having an upper portion adapted to be mounted on the LCD panel, and a lower portion adapted to be secured on the base;
- a display power connector mounted on the housing and adapted to connect electrically the LCD panel to a power source;
- a display signal connector mounted on the housing and adapted to connect electrically the LCD panel to a computer;
- a first hub power connector mounted on the housing and providing a voltage output; and
- a USB hub module including a hub casing, a USB connector set mounted on the hub casing, a second hub power connector mounted on the hub casing, and a USB hub controller mounted inside the hub casing and connected electrically to the connector set and the second hub power connector, the hub module being mounted detachably on the housing such that the second hub power connector engages removably the first hub power connector for supplying the voltage output from the first hub power connector as operating power to the hub controller.

Preferably, a cover plate is mounted removably on the housing to cover the first hub power connector when the hub module is detached from the housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
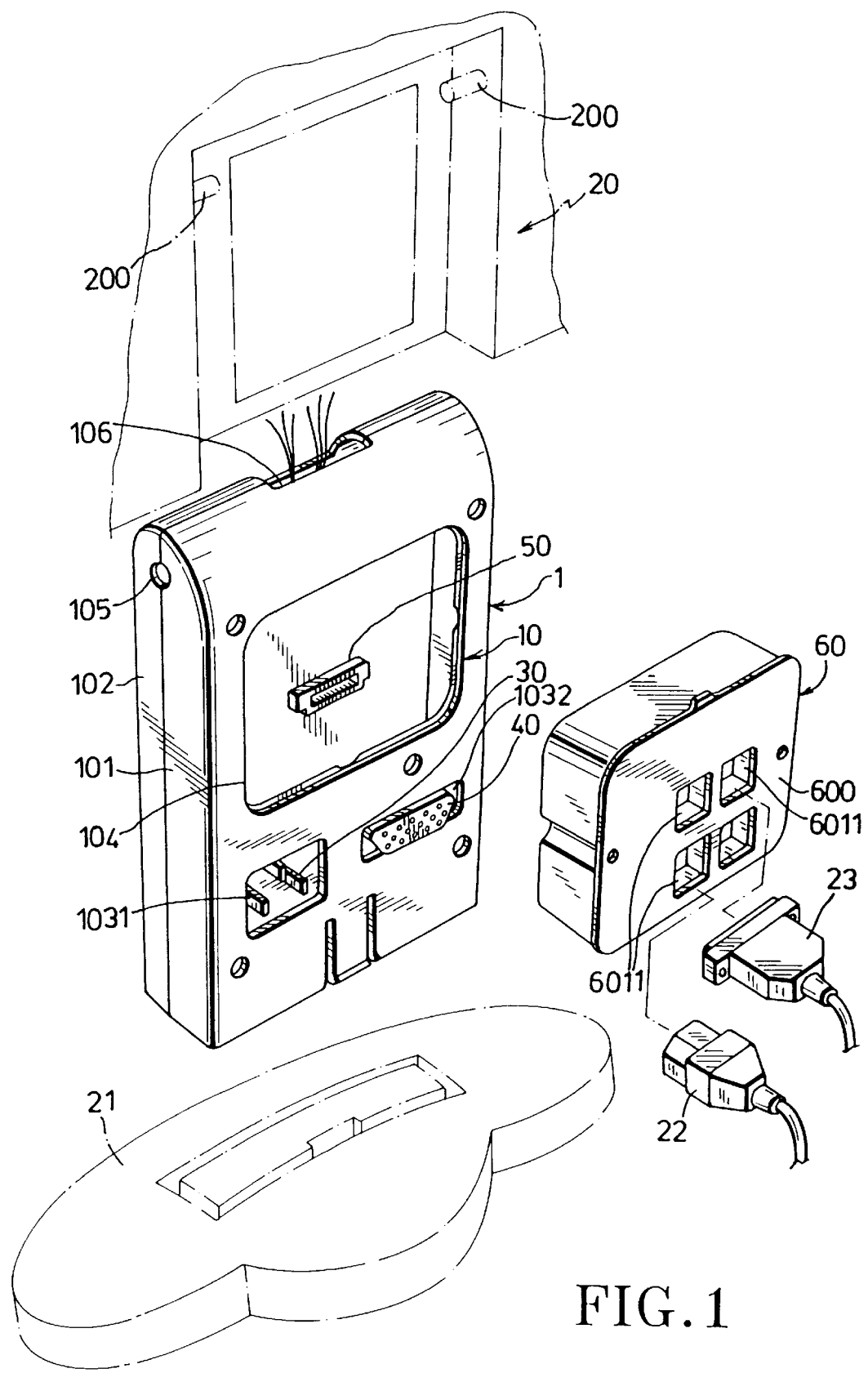
FIG. 1 is an exploded perspective view of the preferred embodiment of a stand with a detachable USB hub module according to the present invention.
Figure 2:
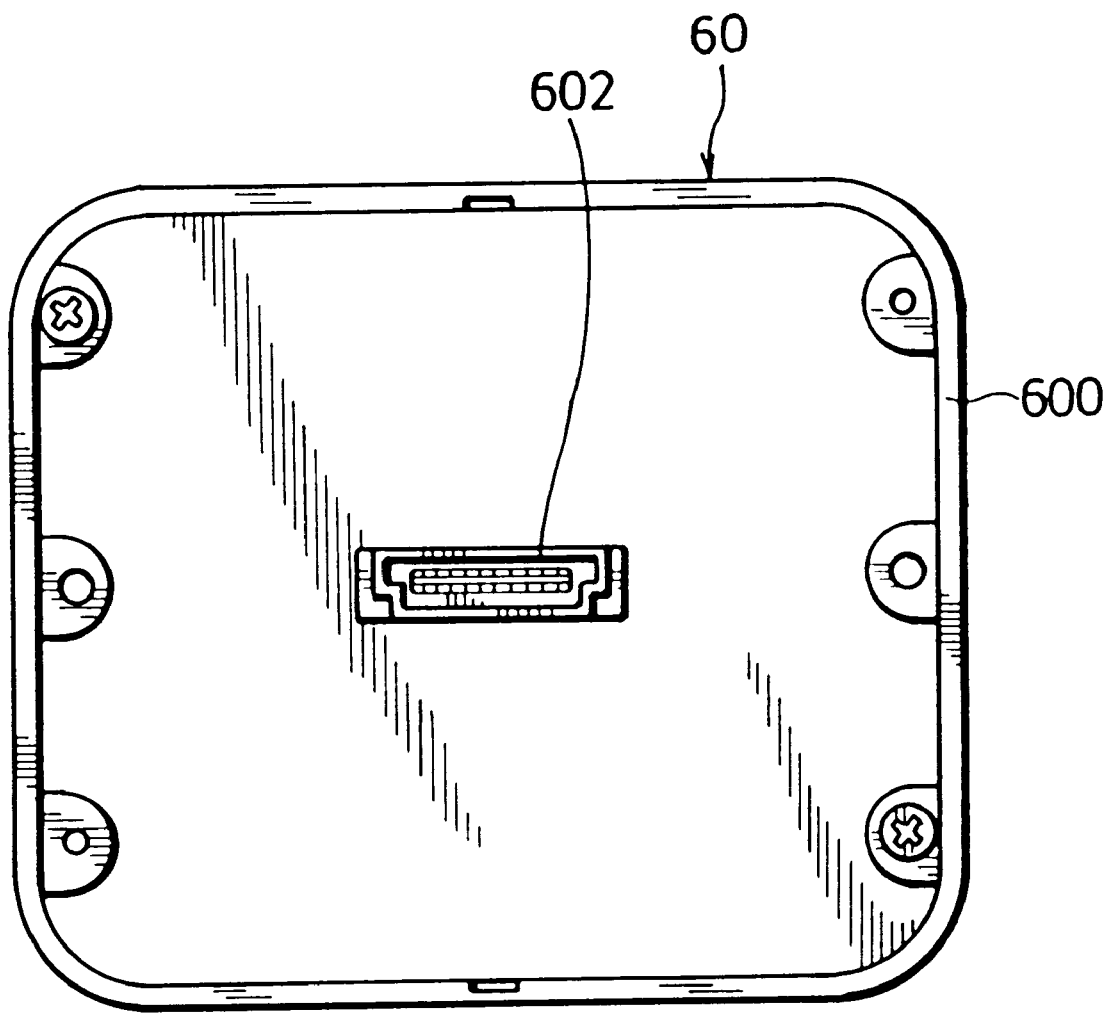
FIG. 2 is a schematic rear view illustrating the USB hub module of the preferred embodiment.
Figure 3:
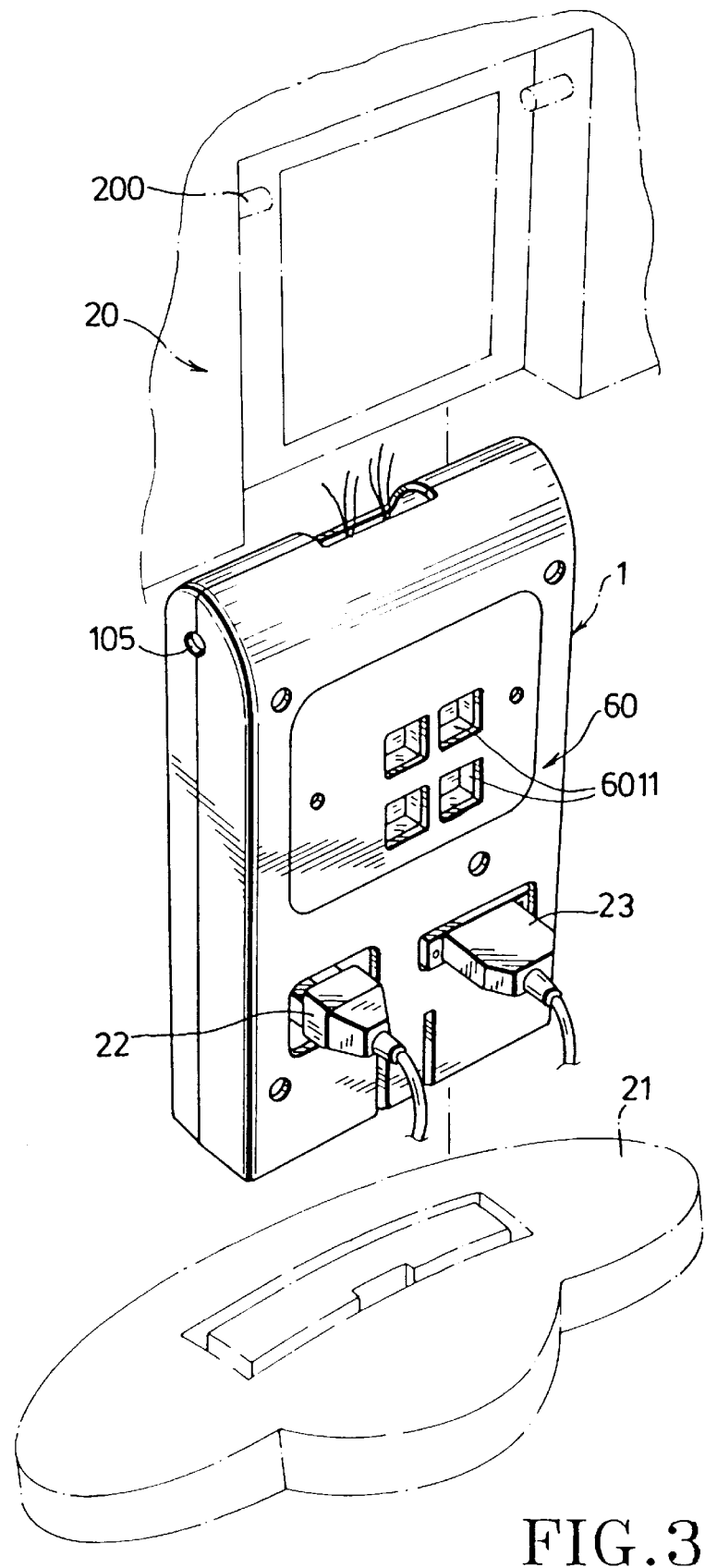
FIG. 3 is a perspective view illustrating the USB hub module when mounted on a housing of the preferred embodiment.

Referring to FIG. 1, the preferred embodiment of a stand 1 according to the present invention is shown to comprise a housing 10 formed from complementary housing parts 101, 102. The housing part 101 is formed with first, second and third openings 1031, 1032, 104. The housing 10 has an upper portion formed with a pair of pivot holes 105 (only one is shown) on opposite lateral sides and adapted for engaging a pair of pivot pins 200 on a bottom portion of an LCD panel 20, thereby mounting pivotally the housing 10 on the LCD panel 20. The lower portion of the housing 10 is adapted to be secured on a base 21.

Figure 5:
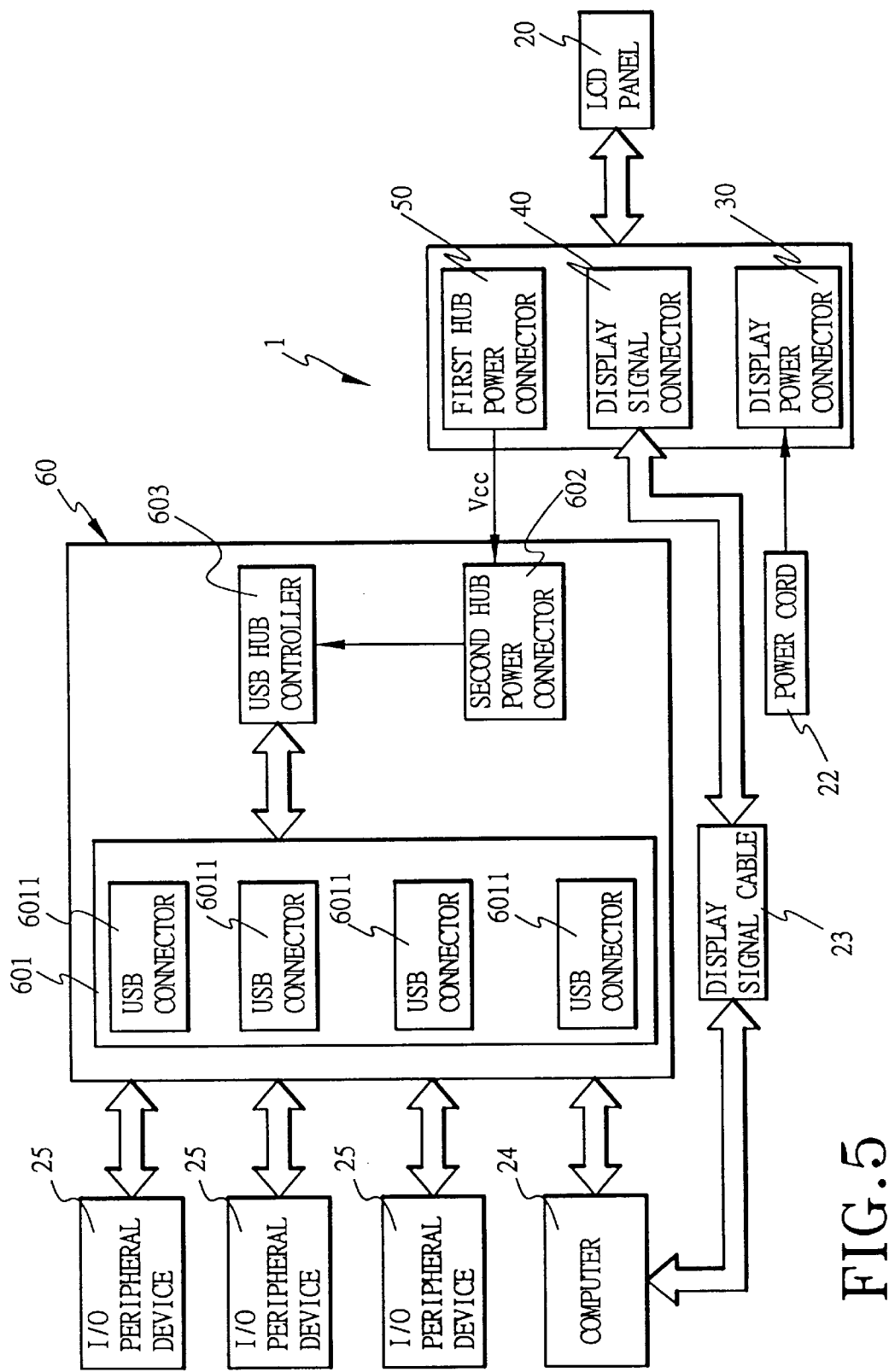
FIG. 5 is a schematic circuit block diagram of the preferred embodiment.

Referring to FIGS. 1 and 5, a display power connector 30 is mounted in the housing 10 and is accessible via the first opening 1031. The display power connector 30 is connected electrically to the LCD panel 20 via electrical wiring that extends through a wiring port 106 formed in the upper portion of the housing 10, and is adapted to mate with a power cord 22, thereby permitting the supply of electrical power to the LCD panel 20.

A display signal connector 40, such as a 15-pin D-sub connector, is mounted in the housing 10 and is accessible via the second opening 1032. The display signal connector 40 is connected electrically to the LCD panel 20 via the electrical wiring that extends through the wiring port 106 in the upper portion of the housing 10, and is adapted to mate with a display signal cable 23, thereby permitting electrical connection between the LCD panel 20 and a computer 24.

A first hub power connector 50 is mounted in the housing 10 and is accessible via the third opening 104. The first hub power connector 50 provides a voltage output (Vcc) that serves as operating power of a USB hub module 60.

Referring to FIGS. 1, 2, 3 and 5, the USB hub module 60 includes a hub casing 600 with front and rear sides, a USB connector set 601 mounted on the front side of the hub casing 600, a second hub power connector 602 mounted on the rear side of the hub casing 600, and a USB hub controller 603 mounted inside the hub casing 600 and connected electrically to the USB connector set 601 and the second hub power connector 602. The USB hub module 60 is mounted detachably on the housing 10 such that the hub casing 600 covers the third opening 104 and such that the second hub power connector 602 engages removably the first hub power connector 50 for supplying the voltage output (Vcc) from the first hub power connector 50 to the USB hub controller 603. In this embodiment, the USB connector set 601 includes four standard USB connectors 6011 adapted for connection to the computer 24 and to other I/O peripheral devices 25, such as printers, scanners, modems, etc. The USB hub controller 603 manages electrical signal transmission among the computer 24 and the I/O peripheral devices 25 via the USB connectors 6011 in a known manner.

Figure 4:
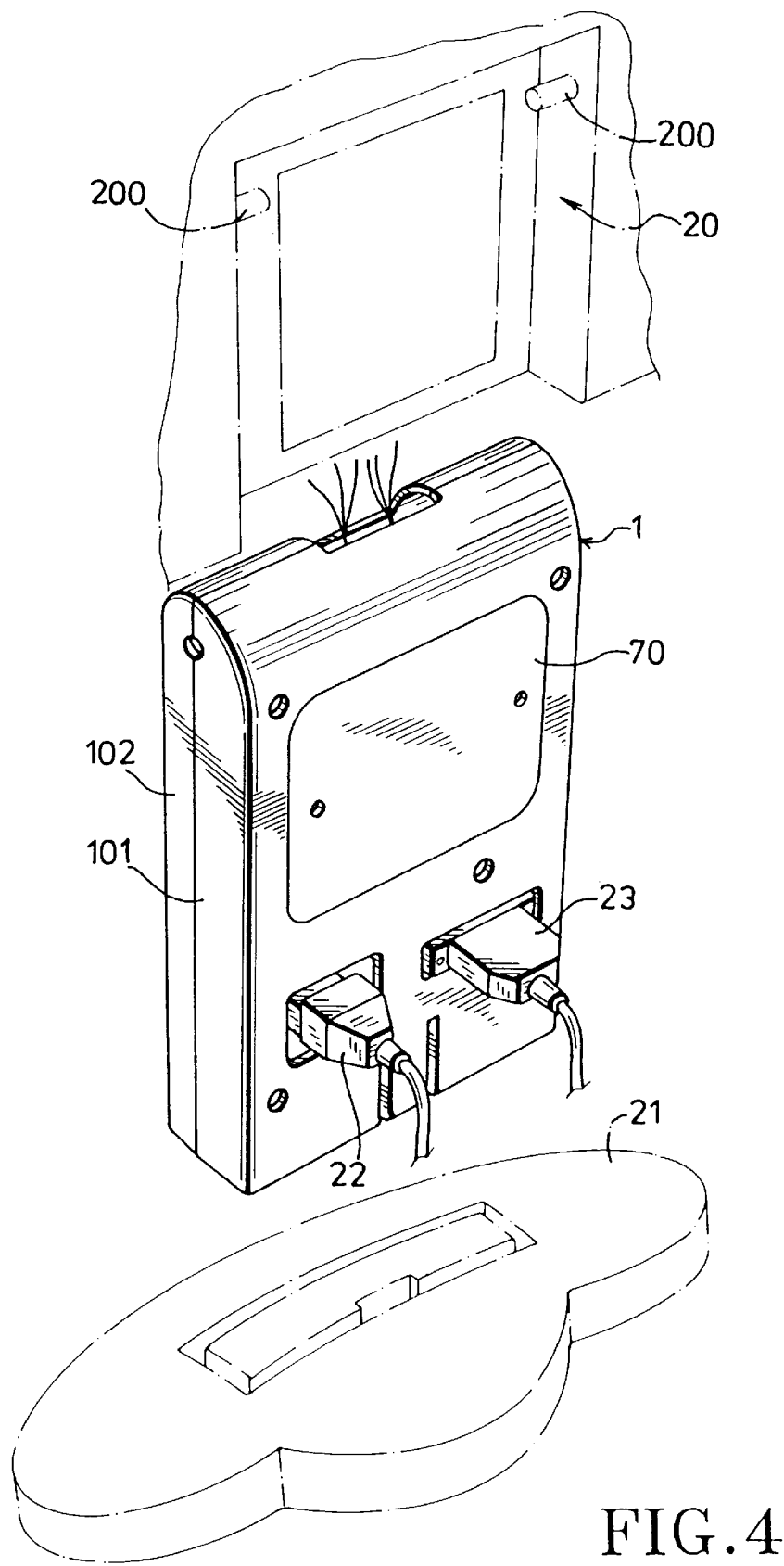
FIG. 4 is a perspective view illustrating a cover plate mounted on the housing of the preferred embodiment when the USB hub module is not in use.

Referring to FIG. 4, when the USB hub module is detached from the housing 10, a cover plate 70 can be mounted removably on the housing 10 to cover the third opening 104 and the first hub power connector 50.

In the present invention, the USB hub module 60 can be sold separately from the housing 10. Thus, manufacturers of LCD devices need not supply two different kinds of stands 1, e.g. one having no USB hub capability and the other having a built-in USB hub capability, to meet the demands of different customers. The object of the present invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A stand adapted for supporting a liquid crystal display panel on a base, said stand comprising:

a housing having an upper portion adapted to be mounted on the liquid crystal display panel, and a lower portion adapted to be secured on the base;

a display power connector mounted on said housing and adapted to connect electrically the liquid crystal display panel to a power source;

a display signal connector mounted on said housing and adapted to connect electrically the liquid crystal display panel to a computer;

a first hub power connector mounted on said housing and providing a voltage output; and a universal serial bus hub module including a hub casing, a universal serial bus connector set mounted on said hub casing, a second hub power connector mounted on said hub casing, and a universal serial bus hub controller mounted inside said hub casing and connected electrically to said connector set and said second hub power connector, said hub module being mounted detachably on said housing such that said second hub power connector engages removably said first hub power connector for supplying the voltage output from said first hub power connector as operating power to said hub controller.

2. The stand according to claim 1, wherein said display signal connector is a 15-pin D-sub connector.

3. The stand according to claim 1, wherein said connector set includes a plurality of standard universal serial bus connectors, said hub controller managing electrical signal transmission among said standard universal serial bus connectors.

4. A stand adapted for supporting a liquid crystal display panel on a base, said stand being adapted for use with a universal serial bus hub module and comprising:

a housing having an upper portion adapted to be mounted on the liquid crystal display panel, and a lower portion adapted to be secured on the base, said housing being formed with an opening adapted for mounting detachably the hub module thereat;

a display power connector mounted on said housing and adapted to connect electrically the liquid crystal display panel to a power source;

a display signal connector mounted on said housing and adapted to connect electrically the liquid crystal display panel to a computer;

a hub power connector mounted on said housing and disposed in said opening, said hub power connector being adapted to engage removably the hub module and providing a voltage output that serves as operating power of the hub module; and a cover plate mounted removably on said housing to cover said opening when the hub module is detached from said housing.

5. The stand according to claim 4, wherein said display signal connector is a 15-pin D-sub connector.

* * * * *